United States Patent Office 3,404,116
Patented Oct. 1, 1968

3,404,116
LATICES OF BUTADIENE COPOLYMERS WITH MONOMERS HAVING HYDROXYL AND CARBOXYL GROUPS
Robert J. Pueschner, St. Louis, and Frederick A. Miller, Midland, Mich., assignors to The Dow Chemical Company, Midland, Mich., a corporation of Delaware
No Drawing. Filed Jan. 5, 1965, Ser. No. 423,592
15 Claims. (Cl. 260—29.7)

This invention relates to an improved process and composition for aqueous emulsion polymerization to produce stable latexes. More particularly, it concerns latexes, and compositions and articles derived therefrom, which have an especially desirable community of properties.

Aqueous dispersions of polymers known as latexes have unquestioned great commercial use and value at the present time. Latexes having differing copolymer compositions are well known for a variety of uses such as coatings and impregnants either alone or in a variety of formulations. Specific combinations have been developed having a highly advantageous property for a special application. Nevertheless, deficiencies exist in the community of properties of synthetic or natural materials available for specific uses, for example, in paper coating compositions or in aqueous compositions for the preparation of solid cellular materials. As is well known, paper coating compositions comprise pigments such as clay and an adhesive material which very often, in the present state of the art, contains or consists of a synthetic latex. While such compositions are highly advantageous, improvements are desired in several characteristics thereof. For example, improvements are desired in electrolyte tolerance and shear stability. Additionally, many of the coating color formulations contain protein. A problem with such formulations is thickening or high viscosity. Reduced viscosity is desired in order to make possible the use of aqueous compositions having a higher solids content with the attendant advantages therefrom while retaining desired processing characteristics. Especially desirable is a combination of the advantageous properties in a single composition.

It has been discovered, and this discovery is the subject of this invention, that an improved latex composition is obtained by copolymerizing by emulsion polymerization procedures a monomer mixture comprising in ratios hereinafter described (1) a monovinylidene aromatic compound such as styrene, (2) a conjugated diene such as butadiene, and (3) a hydroxyl-containing ester of an aliphatic diol and an α,β-ethylenically unsaturated aliphatic monocarboxylic acid, such as β-hydroxyethyl acrylate. By such a procedure and composition a stable colloidal dispersion of a copolymer, commonly called a latex, is obtained. The latex obtained thereby has especially advantageous properties for a paper coating composition, e.g. protein-containing coating colors comprising this latex have a desirable and sought-after characteristic of low viscosity (reduced protein thickenability). However, the preferred compositions of this invention require in the copolymer comprising the latex (in addition to the hydroxyl-containing ester) a copolymerized α,β-ethylenically unsaturated aliphatic carboxylic acid. Such latex compositions have improved tolerance for electrolytes, especially inorganic cations which are inadvertently or intentionally added, for example, in a customary formulation to prepare a pigmented paper coating composition. The latexes per se and the pigmented coating compositions have enhanced shear stability and reduced protein thickenability.

The monovinylidene aromatic compounds are represented by styrene, substituted styrenes (e.g., styrene having halogen, alkoxy, cyano or alkyl substituents), vinyl naphthalene and the like. Specific examples are styrene, α-methylstyrene, ar-methylstyrene, ar-ethylstyrene, α,ar-dimethylstyrene, ar,ar-dimethylstyrene, ar-t-butylstyrene, methoxystyrene, cyanostyrene, acetylstyrene, monochlorostyrene, dichlorostyrenes, other halostyrenes and vinylnaphthalene.

In these specifications and claims, by the word "monovinylidene" in the term "monovinylidene aromatic" monomer or compound is meant that to an aromatic ring in each molecule of the monomer or compound is attached one radical of the formula,

wherein R is hydrogen or a lower alkyl such as an alkyl having from 1 to 4 carbon atoms.

The conjugated dienes operable in the practice of this invention include butadiene and substituted butadiene and other acyclic compounds having at least two sites of ethylenic unsaturation separated from each other by a single carbon-to-carbon bond. Specific examples are isoprene, chloroprene, 2,3 - dimethylbutadiene-1,3, methylpentadiene, and especially 1,3-butadiene (often abbreviated butadiene).

The hydroxyl-containing esters of α,β-ethylenically unsaturated aliphatic monocarboxylic acids advantageously are esters of acrylic acid and alpha-substituted acrylic acids (such as alpha-lower-alkyl substituted acids, especially methacrylic acid), all of which esters have a monohydroxy substituent in the alcohol moiety of the ester. In the hydroxy-containing esters there are at least two carbon atoms in the chain between the hydroxyl group and any other oxygen atom. Representatives of such esters are β-hydroxyethyl acrylate, β-hydroxypropyl acrylate, β - hydroxyethyl methacrylate, β - hydroxypropyl methacrylate, 4-hydroxybutyl acrylate, 4-hydroxybutyl methacrylate and 5-hydroxypentyl methacrylate. In addition to the above representative hydroxyl-containing esters, there may also be used other similar esters of alpha-alkyl substituted acrylic acids in which the alpha-alkyl substituent has from 2 to 4 carbon atoms, or more. Thus, the radical attached to the alpha-carbon of the acrylic acid moiety of the hydroxyl-containing ester may be hydrogen or an alkyl radical having from 1 to 4, or more, carbon atoms.

The α,β-ethylenically unsaturated aliphatic carboxylic acids are monoethylenically unsaturated monocarboxylic, dicarboxylic and tricarboxylic acids having the ethylenic unsaturation alpha-beta to at least one of the carboxyl groups and similar monomers having a higher number of carboxyl groups. It is understood that the carboxyl groups may be present in the acid (—COOH) or salt form (—COOM) and are readily interconvertible by well known simple procedures.

Specific examples of the α,β-ethylenically unsaturated aliphatic carboxylic acids are acrylic acid, methacrylic acid, fumaric acid, itaconic acid, maleic acid, aconitic acid, various α-substituted acrylic acids such as α-ethacrylic acid, α-propyl acrylic acid, α-butyl acrylic acid and the like.

The proportions of the various polymerizable constituents employed in preparing latexes in the practice of this invention depend somewhat on their identity and considerably upon the end use contemplated for the product.

When the polymerizable constituents consist essentially of a vinylidene aromatic compound, an acrylic conjugated diene and a hydroxyl-containing ester (all as hereinbefore defined), the polymerizable monomers are used in amounts of from about 48 to about 80 percent by weight of the vinylidene aromatic compound, from about 19.5 to about 49 percent by weight of the conjugated diene and from about 0.5 to about 10 percent, preferably from 3 percent to about 6 percent, by weight of the hydroxyl-containing ester, all percentages being based on the weight of the polymerizable constituents. Latexes from such pomerizable constituents, prepared in the manner described hereinafter, are especially useful for the preparation of paper coating compositions which have the desired properties of reduced protein thickenability as well as increased shear stability and electrolyte tolerance compared to similar compositions prepared from prior art styrene-butadiene latexes.

The preferred compositions, however, require in the polymerizable constituents a hydroxyl-containing ester and an $\alpha,\beta$-ethylenically unsaturated aliphatic carboxylic acid for the preparation of the latex. The latex compositions of this class are prepared from aqueous compositions containing as polymerizable constituents from about 0 to about 99 percent by weight of a vinylidene aromatic monomer, from about 0 to about 99 percent by weight of a conjugated diene, from about 0.5 to about 10 percent by weight of a hydroxyl-containing ester and from about 0.25 percent to about 10 percent by weight of an $\alpha,\beta$-ethylenically unsaturated aliphatic carboxylic acid. Such monomeric compositions are readily polymerized by emulsion polymerization methods to form latexes especially stable to shear and to the addition of electrolytes. The latexes thus prepared are useful in preparing latex solid foam by the method of Belgian Patent 633,642. For such use, however, the especially preferred compositions selected from the above constituents and proportions consist essentially of from about 0 percent to about 49.5 percent by weight of the vinylidene aromatic monomer, from about 48 to about 97.5 percent by weight of the conjugated diene, from about 2 percent to about 6 percent by weight of the hydroxyl-containing ester and from about 0.5 percent to about 3 percent by weight of the $\alpha,\beta$-ethylenically unsaturated carboxylic acid. In addition to ease of preparation and stability as previously noted, the especially preferred compositions confer improved resiliency, toughness and other properties to the latex foam prepared therefrom.

When compositions within this class are selected for use in coating compositions, the monomeric constituents required to prepare the latex consist essentially of from about 48 percent to about 79 percent of the vinylidene aromatic monomer, from about 19.5 to about 49 percent by weight of the conjugated diene, from 0.5 to about 10 percent by weight of the hydroxyl-containing ester and from 0.25 percent to about 10 percent by weight of the $\alpha,\beta$-ethylenically unsaturated acid; especially preferred compositions, however, because of a highly advantageous combination of properties, are the emulsion polymerization product of from about 58 percent to about 62 percent by weight of the monovinylidene aromatic monomer, from about 29 percent to about 38 percent by weight of the conjugated diene, from about 3 percent to about 6 percent by weight of the hydroxyl-containing ester and from about 1 percent to about 3 percent by weight of the $\alpha,\beta$-ethylenically unsaturated carboxylic acid. The latexes obtained from these preferred compositions possess in high degree the desirable properties contributed by the binder to a coating color, e.g., high pigment binding strength, good wet and dry pick, and especially provide for reduced protein thickenability (reduced viscosity), high stability to shear and improved tolerance for electrolytes.

In the preparation of latexes from the polymerizable constituents described above, an aqueous starting composition comprising the polymerizable material is prepared which may contain polymerization catalysts of the kinds and in the amounts already known to promote emulsion polymerization—the amounts usually being from about 0.01 percent to about 3.0 percent by weight, based on the total weight of the polymerizable constituents. Among such catalysts are water-soluble oxidizing agents such as hydrogen peroxide and potassium persulfate and catalysts which like the redox catalysts, are activated in the water phase, e.g., by a water soluble reducing agent. Other free radical producing means, such as exposure of the composition to activating radiations, optionally may be employed rather than heat and/or catalytic compounds to activate the polymerization. When the polymerizable constituents comprise $\alpha,\beta$-ethylenically unsaturated carboxylic acids, the acceptable catalysts are those which cause polymerization of ethylenic monomers, e.g., styrene, in aqueous media having a pH value of less than about 7. The starting compositions may include acids or salts to provide a desired pH value and possibly a buffered system. When the polymerizable constituents comprise an unsaturated carboxylic acid, the pH values range from about 2 to about 7 during the polymerization step.

When the polymerizable constituents do not include an $\alpha,\beta$-ethylenically unsaturated carboxylic acid, the pH during polymerization may range from about 2 to about 10, but usually is from about 2 to about 7.

Usually the starting composition also contains an emulsifier (or surfactant) of the kinds customarily used in emulsion polymerization. Usually at least one anionic emulsifier is included and one or more of the known non-ionic emulsifiers may also be present. Representative types of anionic emulsifiers are the alkyl aryl sulfonates, the alkali metal alkyl sulfates, the sulfonated alkyl esters, the fatty acid soaps and the like. Specific examples of these well known emulsifiers, for the purpose of illustration and not for limitation, are dodecylbenzene sodium sulfonate, sodium butylnaphthalene sulfonate, sodium lauryl sulfate, disodium dodecyl diphenyl ether disulfonate, N-octadecyl disodium sulfosuccinate and dioctyl sodium sulfosuccinate.

Optionally other ingredients well known in the emulsion polymerization art may be included such as chain transfer agents, chelating agents, and inorganic salts.

Copolymerization of the various described monomers to produce the interpolymer latexes ordinarily is carried out at a temperature between about 60° and about 98° C. However, when catalyst activators are used as discussed supra, lower temperatures are effective. During interpolymerization, the temperature may be controlled in part by the rate at which the monomers are supplied and interpolymerized and/or by applied cooling.

As taught in the art, emulsion polymerization may be performed batchwise or continuously. It is possible to work entirely batchwise, emulsifying the entire charge of monomers and proceeding with polymerization. It is usually advantageous, however, to start with part of the monomers which are to be used and add the remainder of the monomer or monomers as polymerization proceeds. An advantage of gradual monomer addition lies in reaching a high solids content with optimum control and with maximum uniformity of product.

The emulsion polymerization process for preparing the interpolymer latexes of the present invention may commence with the addition of a polymerization catalyst to the aqueous reaction vehicle in a suitably equipped reaction vessel optionally while purging the reaction atmosphere with an inert gas, such as nitrogen or methane. When the contents of the reactor reach the predetermined temperature of polymerization as discussed supra, the gradual addition of the monomer mixture is started.

At this stage of the emulsion polymerization process, an emulsifier may be added to the reaction mixture or alternatively an emulsifier may be included in the aqueous phase before addition of any of the monomer. After the addition of the emulsifier, if used, the balance of monomers may be introduced while continuing polymerization to bring the content of dispersed interpolymer to from about 5 percent to about 60 percent of the total dispersion, preferably to from about 35 percent to about 55 percent by weight. Interpolymerization should be carried on while the predetermined temperature is maintained until no more than a few percent of monomers remain in the mixture. This can frequently be achieved in approximately 2 to 20 hours.

Agitation usually is required to form the dispersion initially and to maintain the dispersion throughout polymerization. The rate of agitation to be used in any particular instance will be dependent primarily on the overall design of the polymerization equipment. Near the minimum amount of agitation required to form and to maintain the dispersion is usually to be desired although the precise rate is not critical.

The pH of the aqueous interpolymer latex may be raised by adding ammonia or a water-soluble amine, or an inorganic base, such as potassium hydroxide or ammonium hydroxide, or a mixture thereof, either before or after cooling the product. Often the pH value is adjusted to from about 5 to about 7, very often to about 6.5. However, the pH may be raised to 9 or 10, or even higher if desired.

The aqueous interpolymer latex dispersion having been permitted to cool to room temperature, the interpolymer latex product then may be separated from undesirable impurities by filtering the latex globules through a filter such as of stainless steel having the filter surface perforated to correspond with the standard 100-mesh size of the U.S. Standard Sieve Series.

The interpolymer latexes, prepared by the process described above, containing between about 5 and about 60 weight percent latex solids can be commingled with small amounts of thickening agents, colloidal stabilizers, antifoaming agents, preservatives, pigments, pigment extenders and plasticizers, and addition emulsifiers, if desired. To these instant formulated latex compositions may also be added a base acting material such as sodium hydroxide if any of the additaments should tend to partially acidify the formulation.

The above-described latexes are especially advantageous for the preparation of coating compositions for paper, paperboard and the like. Such coatings comprise pigments and the herein described latexes as part or all of the binder.

The pigments which are used are finely divided materials which are predominantly mineral in character but may be partly organic. Additionally, for the practice of this invention, a predominant portion, i.e. at least 50 percent of such finely divided pigmentary materials consists of clays, especially of the kaolin type. However, calcium carbonate and titanium dioxide are commonly employed and other materials such as talc, blanc fixe, ochre, carbon black, aluminum powder or platelets and similar pigmentary matter may be used in minor proportions. The pigment, or pigment mixture, preferably is dispersed in water and the pH of the resulting dispersion normally is adjusted to a value of from about 6 to about 9 before mixing with the said latex to form the aqueous mineral coating composition. Tetrasodium pyrophosphate often is used as a dispersing aid in forming the pigment dispersion and in that case no additional pH adjustment usually is required. On the other hand, if no other additives are present while forming the aqueous dispersion or if agents which are acidic or which require an alkaline pH for effectiveness are used, such as sodium hexametaphosphate, a pH adjustment usually is made with alkalizing agents such as sodium hydroxide, potassium hydroxide, ammonium hydroxide, and the like.

The term "pigment" is used herein in the sense of definition (1) in Hackh's Chemical Dictionary, McGraw-Hill Publishing Co., New York, 3rd ed., 1944, page 659.

The term "coating color" often is applied in the art to the aqueous dispersion comprising the adhesive and the pigment. The adhesive and the pigment dispersion are mixed in such proportions that for each 100 parts by weight of dry pigment from about 5 to about 30 parts by weight, dry basis, of the adhesive are present in the aqueous mixture. The latex disclosed by this invention may be the sole pigment-binding adhesive employed in the coating color for use in the practice of this invention or other adhesives known to the art, e.g., other latexes, casein, soybean proteins and starches, may be used in conjunction with the latex if desired. Most advantageously from 20 percent to 100 percent by weight of the adhesive in a coating color of this invention is the latex described herein, the percentages being based on a dry solids basis. However, a lower proportion of latex may be used, even as low as about 5 percent of the total adhesive with some advantageous results. Thus the coating color preferably comprises from about 1 to about 30 parts by weight of latex solids per 100 parts of pigment, dry basis, in the aqueous mixture.

The total solids content of the coating color does not differ substantially from that in prior are processes, depends largely on the equipment being used and usually ranges from about 8 percent to about 65 percent.

The aqueous mineral coating composition (coating color) is applied to the paper by conventional means such as letterpress print roll coater, offset roll coater, size press, air knife, and blade coater, After application of the coating it is dried by any convenient method but such drying often is accomplished by causing a current of air at a velocity of up to about 10,000 feet per minute to impinge on the surface of the coated material. The temperature of the air may vary up to 600° F. but the duration of contact of the heated air with the coating is such that the coating is not heated above about 250° F.

The "roll stability" test is carried out as follows. Two rolls made of different material having different hardness, e.g., one rubber roll and one steel roll, are held together by pressure thus causing a compression, or nip, between the rolls. The aqueous binder is caused to flow between the rolls as they are counter rotating and this action results in shearing forces on the aqueous dispersion. A dispersion which after ten minutes has not plated out noticeably on the rolls will be stable for a considerably longer time. If no plating out can be seen after at least 10 minutes, the material is considered to have passed the test.

The dry pick, or dry pick resistance is recorded according to the results obtained with the standard IGT pick test using the standard equipment and procedure well known in the art.

The following examples are given to illustrate more clearly the principle and practice of this invention to those skilled in the art and are not for the purpose of limitation. All parts and percentages are by weight unless otherwise indicated.

EXAMPLE 1

A latex was prepared from the following constituents:

| | Parts |
|---|---|
| Water | 100 |
| Dodecylbenzene sodium sulfonate | 2 |
| Potassium persulfate | 0.4 |
| Bromoform | 0.5 |
| β-Hydroxyethyl acrylate | 6 |
| Styrene | 23 |
| 1,3-butadiene | 19 |

After the constituents had been charged to a polymerization vessel, the resulting aqueous composition was heated to 66° C. and was maintained at that temperature for 15¾ hours with agitation. A stable latex containing 34.3 percent solids was obtained thereby. After a paper coating composition was prepared from the latex and No. 1 coating clay in the ratio of 15 parts (solid basis) of latex per 100 parts of the clay, the composition was applied to paper, dried and tested for wet pick. The latex was compatible with the pigment formulation and the wet pick results were considerably better than obtained from a similar formulation using a commercial styrene-butadiene latex which is intended for pigmented paper coating use.

EXAMPLE 2

A latex was prepared by the method and with the constituents of Example 1, except that 1 part of fumaric acid was also included in the starting composition. The resulting latex has 34.3 percent solids.

A paper coating composition prepared from the latex of this example in the same manner as in Example 1 showed even further improved wet pick.

EXAMPLE 3

A latex was prepared by a two-step procedure from the following constituents.

First step

| Constituent: | Parts by weight |
|---|---|
| Water | 100 |
| Sodium lauryl sulfate | 0.05 |
| Potassium persulfate | 1.32 |
| Styrene | 42 |
| Butadiene | 56 |
| Acrylic acid | 0.5 |
| Fumaric acid | 0.25 |
| Carbon tetrachloride | 1 |
| Sodium bicarbonate | 0.8 |

Second step

| | |
|---|---|
| Water | 10 |
| Potassium persulfate | 0.1 |
| β-Hydroxyethyl acrylate | 2.5 |
| Sodium lauryl ether sulfate | 1 |

In the first step, the aqueous composition was heated with stirring at 70° C. for 15 hours. The constituents for the second step were then added and the heating and stirring continued for 6 hours. The pH of the resulting aqueous composition was adjusted to a value of 9 by the addition of ammonium hydroxide. The resulting latex had a solids content of 47 percent. After concentration by use of heat and reduced pressure, the pH was readjusted to about 9 and the solids content was 55 percent. The concentrated high-solids, stable latex was converted to solid foam having excellent color, good cell structure, and high resilience and toughness.

EXAMPLE 4

Stable latexes are obtained by a process wherein the polymerizable constituents are added in a continuous sequence throughout the polymerization period from styrene, butadiene, β-hydroxyethyl acrylate, and an α,β-ethylenically unsaturated carboxylic acid in the proportions shown in Table I, using potassium persulfate catalyst, an anionic emulsifier such as sodium lauryl sulfate and optionally a chain transfer agent such as carbon tetrachloride. In varying the temperature from the about 60° C. to about 98° C., the time for complete polymerization varies inversely as the temperature is changed. Also shown in Table I are the approximate compositions of other latexes, not examples of this invention, which are made and recommended for pigmented coating compositions. Also shown in Table I are some of the properties of latexes of this invention (4A to 4G, inclusive) and for comparison therewith properties of prior art latexes (4X, 4Y and 4Z) which are recommended for pigmented coating compositions.

TABLE I

| Example No. | Copolymer composition in parts by weight | | | | | | Properties | | | | |
|---|---|---|---|---|---|---|---|---|---|---|---|
| | Styrene | Butadiene | BHEA [1] | AA [2] | FA [3] | IA [4] | Solids, percent | pH | Viscosity,[5] cps. | Particle size, Angstroms | Roll stability, min. |
| 4A | 58 | 37 | 3 | | | 2 | 46.6 | 5.7 | 75 | 1,880 | >15 |
| 4B | 56 | 36 | 6 | | | 2 | 50.7 | 6.0 | 250 | 1,910 | >15 |
| 4C | 50 | 45 | 3 | | | 2 | 48.1 | 6.4 | 150 | 2,090 | >15 |
| 4D | 54 | 41 | 3 | | | 2 | 50.1 | 6.3 | 200 | 1,760 | >15 |
| 4E | 58 | 37 | 3 | | | 2 | 46.5 | 6.0 | 60 | 1,940 | >15 |
| 4F | 62 | 33 | 3 | | | 2 | 49.9 | 6.7 | 90 | 2,120 | >15 |
| 4G | 66 | 29 | 3 | | | 2 | 50.8 | 6.3 | 150 | 2,170 | >15 |
| 4X [6] | 53 | 43 | | 1 | 3 | | 48 | 9.0 | 80 | 1,900 | >15 |
| 4Y [6] | 60 | 40 | | | | | 48 | 10.5 | 30 | 1,900 | 2 |
| 4Z [6] | (Commercial polyvinyl acetate) | | | | | | 47 | 6.0 | 50 | 1,400 | 5 |

[1] BHEA = β-Hydroxyethyl acrylate.
[2] AA = Acrylic acid.
[3] FA = Fumaric acid.
[4] IA = Itaconic acid.
[5] Viscosity value obtained using No. 1 spindle at 20 r.p.m. (Brookfield).
[6] Not examples of this invention—for comparison.

The latexes shown in Table I individually were mixed with the same proportion of a pigment known to contain significant quantities of multivalent inorganic cations. Whereas all of the compositions containing latexes 4A to 4G, inclusive (i.e., latexes of this invention), were still fluid when the test was terminated after 30 minutes, the compositions with latex 4X became unduly thick after 16 minutes, with latex 4Y in less than 10 seconds and with later 4Z in 2.5 minutes. For the ethylenically unsaturated acid of the compositions of Example 4, there may be substituted acrylic acid, methacrylic acid, maleic acid, fumaric acid or aconitic acid with substantially the same results.

EXAMPLE 5

Pigmented coating compositions were prepared from the latexes described in Example 4 using 18.5 parts (solids basis) of the latex, 3.5 parts (dry basis) of low viscosity protein, and 100 parts of No. 1 coating grade clay (kaolin type). The solids content of the aqueous composition was adjusted to 55 percent by the addition of water, and the pH to 9.0 by the addition of ammonium hydroxide. The viscosity (Brookfield, using the No. 4 spindle at 20 r.p.m.) of the resulting coating color was determined and is shown in Table II. The coating color was applied to 14-point bleached kraft stock in the amount of 5 pounds per 1000 square feet, then the coated stock was dried at 220° F. for 2 min. and calendered through 1 nip. The dry pick of the resulting treated stock is also shown in Table II.

TABLE II

| Example No. | Latex from example No. | Coating color viscosity, cps. | Dry Pick [1], ft./min. |
|---|---|---|---|
| 5A | 4A | 1,400 | 380 |
| 5B | 4B | 1,000 | 340 |
| 5C | 4C | 1,400 | 360 |
| 5E | 4E | 1,400 | 340 |
| 5F | 4F | 1,400 | 260 |
| 5G | 4G | 1,200 | 230 |
| 5X [2] | 4X | 2,500 | 275 |
| 5Y [2] | 4Y | 1,800 | 180 |

[1] I.G.T., No. 7 ink, "A" sector.
[2] Not examples of this invention.

In all of the preceding examples, this invention has been illustrated by compositions in which the interpolymer in the latex comprised copolymerized styrene and butadiene. However, for the styrene component there may be substituted other vinylidene aromatic monomers such as vinyl toluene, ar-ethylstyrene, ar-t-butylstyrene, ar,ar-dimethylstyrene, chlorostyrene and for the butadiene there may be substituted other conjugated dienes such as isoprene, chloroprene and 2,3-dimethylbutadiene-1,3 with substantially the same results.

Also in all the examples other hydroxyl-containing esters such as β-hydroxyethyl methacrylate, β-hydroxypropyl acrylate, β-hydroxypropyl methacrylate, 4-hydroxybutyl acrylate and 4-hydroxybutyl methacrylate may be substituted for the β-hydroxyethyl acrylate with substantially the same results.

In these specifications and claims, the term "paper" is intended to mean sheets or webs of fibrous materials which consist mainly of the fibers of cellulose such as is obtained from wood pulp, cotton, bark and straw and which range from very thin and very flexible sheets or webs to relatively thick, rigid board including substances known variously as paperboard, pasteboard, cardboard, and the like.

What is claimed is:

1. A stable latex composition comprising an aqueous dispersion of a copolymer of ethylenically unsaturated monomers consisting essentially of from about 0.5 percent to about 10 percent by weight of a hydroxyl-containing ester of an aliphatic diol and an α,β-ethylenically unsaturated aliphatic monocarboxylic acid, from about 0.25 percent to about 10 percent by weight of an α,β-ethylenically unsaturated aliphatic carboxylic acid, from 0 to about 79 percent of a monovinylidene aromatic monomer, and from about 19.5 percent to about 97.5 percent of an aliphatic conjugated diene; all percentages being based on the total weight of the monomers.

2. The latex composition of claim 1 in which the amount of the hydroxyl-containing ester comprising the copolymer is from about 2 percent to about 6 percent by weight, based on the total weight of the monomers.

3. The latex composition of claim 1 in which the hydroxyl-containing ester is β-hydroxyethyl acrylate.

4. The latex composition of claim 1 in which the amount of the monovinylidene aromatic monomer is from 0 to about 49.5 percent, the amount of the aliphatic conjugated diene is from about 48 percent to about 97.5 percent, the amount of the hydroxyl-containing ester is from about 2 to about 6 percent, and the amount of the unsaturated carboxylic acid is from about 0.5 percent to about 3 percent.

5. The latex composition of claim 1 in which the amount of the monovinylidene aromatic monomer is from about 48 percent to about 79 percent, and the amount of the aliphatic conjugated diene is from about 19.5 percent to about 49 percent.

6. An aqueous paper-coating composition consisting of an aqueous dispersion comprising (1) a pigment and (2) a copolymer of from about 0.5 percent to about 10 percent by weight of a hydroxyl-containing ester of an aliphatic diol and an α,β-ethylenically unsaturated aliphatic monocarboxylic acid, from about 0.25 percent to about 10 percent by weight of an α,β-ethylenically unsaturated aliphatic carboxylic acid, from about 48 percent to about 79 percent by weight of a monovinylidene aromatic monomer and from about 19.5 percent to about 49 percent by weight of an aliphatic conjugated diene; all percentages being based on the total weight of the monomers.

7. The paper-coating composition of claim 6 in which the hydroxyl-containing ester is β-hydroxyethyl acrylate.

8. The paper-coating composition of claim 6 in which the amount of copolymer in the aqueous dispersion is from about 1 part to about 30 parts by weight per 100 parts by weight of pigment, all parts being on a dry basis.

9. The paper-coating composition of claim 6 in which the amount of hydroxyl-containing ester is from about 3 percent to about 6 percent by weight, based on the total weight of the monomers.

10. The paper-coating composition of claim 6 in which the amount of the α,β-ethylenically unsaturated aliphatic carboxylic acid is from about 1 percent to about 3 percent; based on the total weight of the monomers.

11. An aqueous paper-coating composition comprising (1) a pigment and (2) a copolymer of ethylenically unsaturated monomers; said monomers consisting of a mixture of from about 0.5 percent to about 10 percent by weight of a hydroxyl-containing ester of an aliphatic diol and an α,β-ethylenically unsaturated aliphatic monocarboxylic acid, from about 0.25 percent to about 10 percent by weight of an α,β-ethylenically unsaturated aliphatic carboxylic acid, from about 48 percent to about 79 percent by weight of styrene and from about 19.5 percent to about 49 percent by weight of 1,3-butadiene.

12. A mineral-coated paper product comprising a paper sheet carrying on a surface thereof a dried deposit of a coating comprising (1) a pigment and (2) a binder comprising a copolymer of from about 0.5 percent to about 10 percent by weight of a hydroxyl-containing ester of an aliphatic diol and an α,β-ethylenically unsaturated aliphatic monocarboxylic acid, from about 0.25 percent to about 10 percent by weight of an α,β-ethylenically unsaturated aliphatic carboxylic acid, from about 48 percent to about 79 percent by weight of a monovinylidene aromatic monomer and from about 19.5 percent to about 49 percent by weight of an aliphatic conjugated diene; all percentages being based on the total weight of the monomers.

13. The paper product of claim 12 in which the amount of the copolymer is from about 1 part to about 30 parts by weight per 100 parts by weight of the pigment.

14. The paper product of claim 12 in which the amount of the copolymer is from about 5 parts to about 30 parts by weight per 100 parts by weight of the pigment.

15. A paper product as defined in claim 12 in which the pigment is predominantly clay.

References Cited

UNITED STATES PATENTS

| | | | |
|---|---|---|---|
| 2,468,086 | 4/1949 | Latham et al. | 117—155 |
| 2,580,901 | 1/1952 | Erickson et al. | 260—29.9 |
| 2,819,237 | 1/1958 | Daniel | 260—29.7 |

MURRAY TILLMAN, *Primary Examiner.*

J. T. GOOLKASIAN, *Assistant Examiner.*